A. R. AYERS.
PIPE SUPPORTING SYSTEM FOR LOCOMOTIVE ENGINES.
APPLICATION FILED FEB. 9, 1911.
1,027,973.
Patented May 28, 1912.
2 SHEETS—SHEET 2.
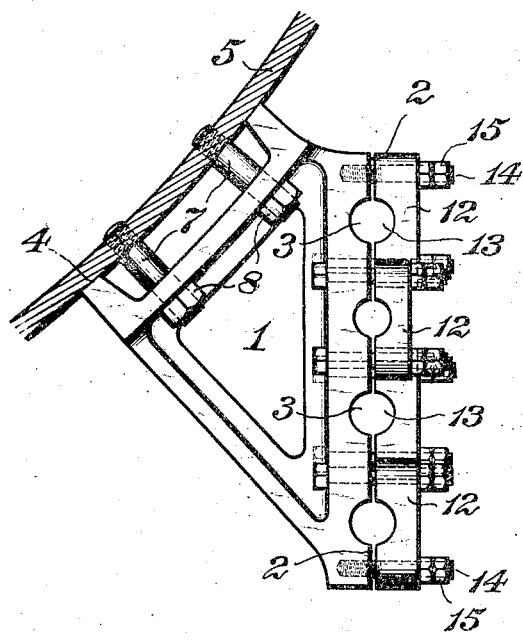
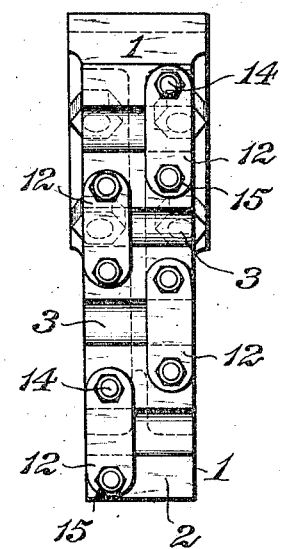

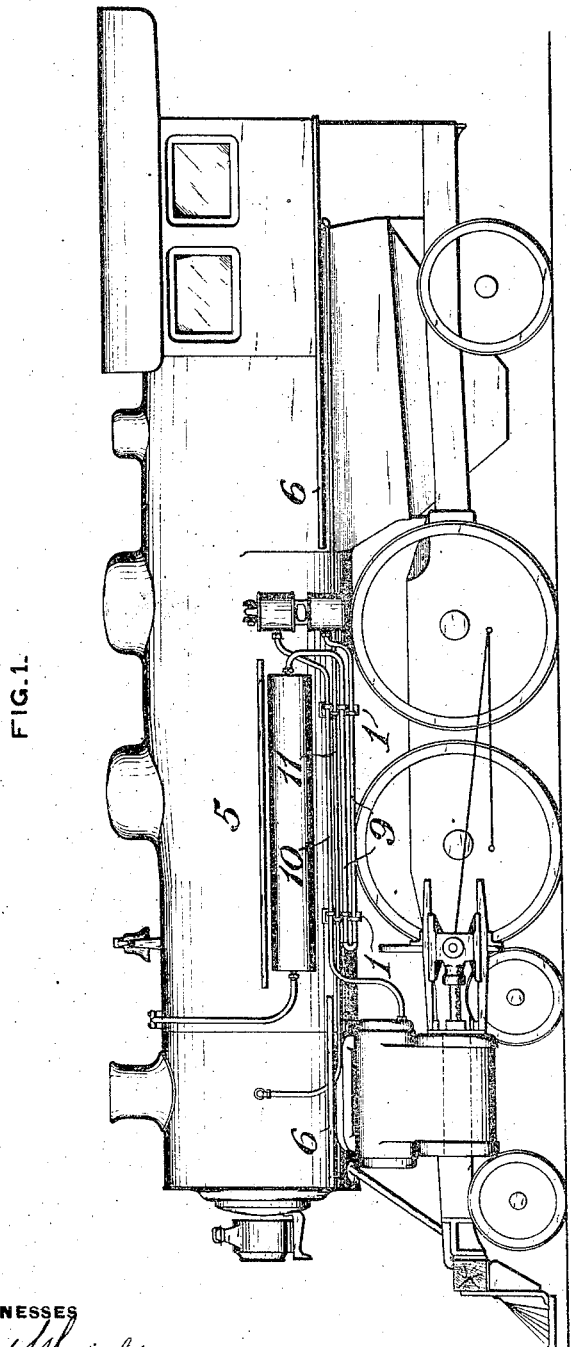

UNITED STATES PATENT OFFICE.

AUGUSTINE R. AYERS, OF CLEVELAND, OHIO.

PIPE-SUPPORTING SYSTEM FOR LOCOMOTIVE-ENGINES.

1,027,973. Specification of Letters Patent. Patented May 28, 1912.

Application filed February 3, 1911. Serial No. 607,553.

*To all whom it may concern:*

Be it known that I, AUGUSTINE R. AYERS, of Cleveland, in the county of Cuyahoga and State of Ohio, have invented a certain new and useful Improvement in Pipe-Supporting Systems for Locomotive-Engines, of which improvement the following is a specification.

The object of my invention is to provide means whereby the air, steam, and water pipes extending on the outside of a locomotive boiler, as well as the cylinder cock operating rods, may be supported in definitely located relation in such manner that the pipes and rods may be spaced at the minimum practicable distance apart, and any single one or more of them be readily inserted in and removed from a determined normal position without liability to misplacement or interference with other similarly supported pipes and rods.

The improvement claimed is hereinafter fully set forth.

In the accompanying drawings: Figure 1 is a side view of a locomotive engine, illustrating an application of my invention; Fig. 2, an end view, on a larger scale, of one form of a pipe support, detached; and, Fig. 3, a front view of the same.

In the practice of my invention, I provide means for definitely locating, and supporting, in predetermined and invariable normal positions upon a locomotive engine, a plurality of pipes and a rod or rods, constituting members thereof, said means consisting of two or more supports, located in different transverse planes of the locomotive, and of such construction, as hereinafter fully described, as to insure the erection, and replacement in normal position after detachment, of each of said members, and to afford the capacity of ready detachment and replacement of any one or more of them, without interference with any other member. In prior practice, so far as my knowledge and information extend, the erection of such pipes and rods has been carried out without any predetermined relative location, and has been largely, if not wholly, a matter in the discretion of the workmen, with the result that they frequently fail to be disposed in the most desirable manner, relatively to other parts, causing unnecessary expanse of pipe fitting and clamping, and strains in piping, and wear in pipes on account of rubbing each other and other parts of the locomotive, and, when taken down, there is no rule or system controlling their proper replacement. These objections are overcome under my invention, by the application of suitably located simple and inexpensive supporting devices, the details of construction of which will now be described.

Each of my improved supports consists of a clamp body, 1, of cast, forged or pressed metal, which, in the instance illustrated, is, in order to combine strength and lightness, made in the form of a plate or web, having lateral flanges on its sides and ends, and having a plane front face, 2, in which are formed a plurality of substantially semi-cylindrical grooves or recesses, 3, the diameter of each of which corresponds with the outside diameter of one of the lines of steam, water or air pipe, or with that of a cylinder cock operating rod which the appliance is intended to support. Said grooves or recesses are so relatively located in the body as to be suited to the desired relative positions of the several pipes and rods which they are, respectively, designed to support, and therefore to insure the erection, and the replacement when detached, of each of said pipes and rods, in a predetermined normal position. The opposite face, 4, of the body, which constitutes the bearing face of the same against the portion of the locomotive on which it is supported, conforms to that of such supporting portion, which, in the instance shown, is the curved shell of the locomotive boiler, 5, the bearing face, 4, being therefore correspondingly curved. Where it is found more convenient or desirable to support the clamp body upon the running board, 6, of the locomotive, or any other portion thereof presenting a flat surface, the bearing face of the clamp body is made flat, accordingly. The clamp bodies are secured detachably upon the locomotive, in such desired and determined positions as may be best suited to the length and general direction of the pipe lines which are to be supported, by bolts, 7, and nuts, 8. The clamp bodies are, as shown, secured to their supports independently of the caps, so that the caps can be removed in all cases without disturbing the clamp bodies.

As shown in Fig. 1, two clamp bodies, 1, 1, are secured to the waist of the locomotive boiler, at a convenient distance apart longitudinally thereon, and, in this instance, are provided for the support of four lines of pipe, viz: the forwardly and the rearwardly extending sections of the air brake pump delivery pipe, 9, the air pump exhaust pipe, 10, and the blower pipe, 11. It will, however, be obvious that, dependent upon the number of grooves, 3, formed in the clamp bodies, they will be adapted for the support of a greater or less number of pipe lines, accordingly as the special design of the locomotive may require.

The pipe lines, 9, 9, 10, and 11, are inserted in the grooves, 3, of the clamp bodies, in which they are held, with the capacity of ready removal and replacement as required, by caps, 12, each having a substantially semi-cylindrical groove or recess, 13, in its inner face, corresponding in diameter with one of the grooves, 3, of the clamp body, said caps being connected removably to the clamp body by bolts, 14, and nuts, 15. In order to enable the pipe lines to be set as closely together as is permitted by the clearance necessary for unions or other fittings, the caps, 12, of the several pipe lines, are alternated in position upon the clamp bodies, so that the lines of their ends overlap in the longitudinal direction of the clamp body, each pipe line being thus entirely clear of the caps of the adjacent lines, and the same pattern of cap being used for the same diameter of pipe in all locations.

It will be apparent to those familiar with the construction and operation of locomotives, that my improvement is readily adaptable, at slight cost, in locomotives of any of the present standard constructions, and that it presents the advantages of accurately alining and firmly supporting any desired number of pipe lines in desired and determined positions, with economy of space and with the capacity of ready removal and replacement of any one or more lines without interference with others.

I claim as my invention and desire to secure by Letters Patent:

1. The combination, with a locomotive engine, of a plurality of supporting clamp bodies, disposed in different transverse planes, each of said clamp bodies being integral and having a bearing face on one side adapted to fit against a fixed part of the locomotive, and a plurality of substantially semi-cylindrical grooves on its opposite side for the reception, in predetermined relative locations, of a plurality of cylindrical members, and independently detachable caps, secured to said clamp bodies, for holding said members in normal relative positions.

2. In a pipe support for locomotive engines, the combination of an integral clamp body having a bearing face on one side adapted to fit against a support on the locomotive, and an opposite plane face having a plurality of substantially semi-cylindrical grooves for the reception of pipe lines, correspondingly grooved independently detachable caps fitting over each of the grooves of the body and alternated in position thereon so that their end lines overlap in the longitudinal direction thereof, and bolts securing said caps to the clamp body.

AUGUSTINE R. AYERS.

Witnesses:
P. P. Mirtz,
F. H. Reagan.